May 24, 1949.  C. B. GARWOOD  2,471,369
METHOD OF MAKING PARISONS
Filed June 26, 1944
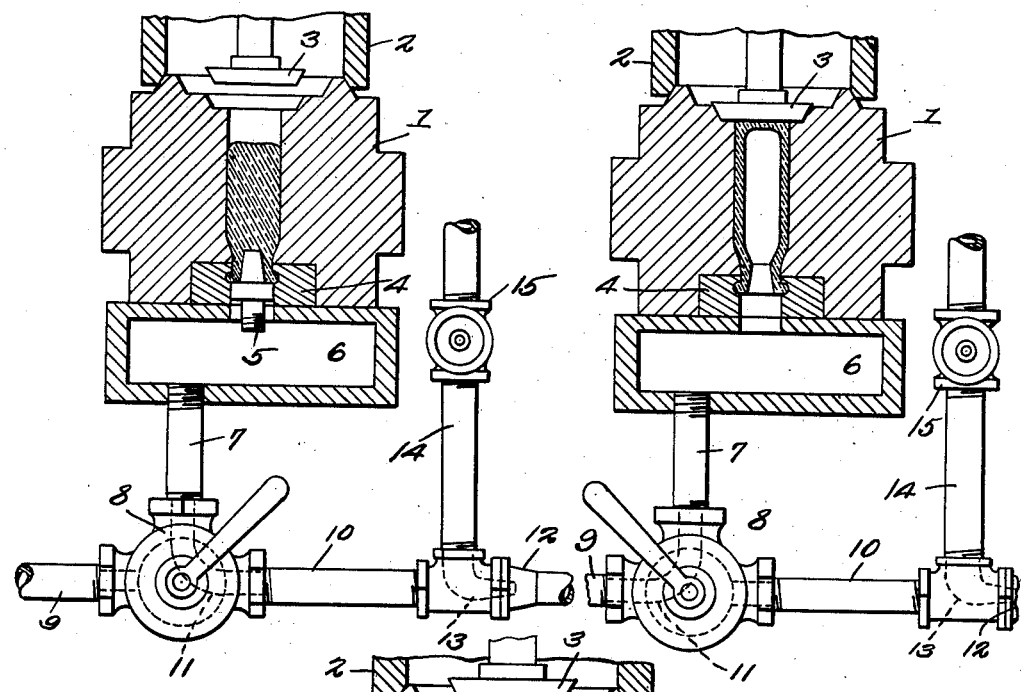
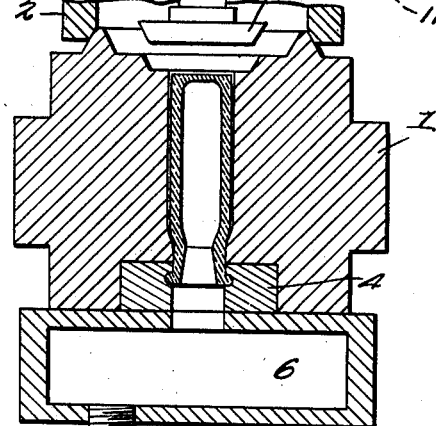
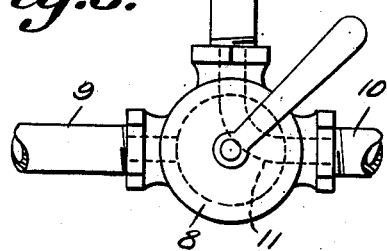
C. B. Garwood
INVENTOR.
BY
ATTORNEYS.

Patented May 24, 1949

2,471,369

UNITED STATES PATENT OFFICE 2,471,369

METHOD OF MAKING PARISONS

Charles B. Garwood, Linthicum Heights, Md., assignor to Carr-Lowrey Glass Co., Baltimore, Md.

Application June 26, 1944, Serial No. 542,171

4 Claims. (Cl. 49—80)

This invention relates to an improved method of making parisons or blanks for machine made bottles utilizing the gob method.

Generally stated a parison is produced by dropping a gob into a parison mold, applying pressure thereto so as to cause the glass to surround the neck pin and fill the lower portion of the mold, withdraw the neck pin and direct air under pressure into the blank, thereby expanding the blank against the walls of the mold, and subsequently disengaging the mold from the blank and transferring the blank by the neck ring, to the finishing mold.

In following the foregoing practice commonly used, the blank is of course maintained in intimate contact with the wall of the mold until the mold is removed therefrom and, as a result, the outer surface portion of the formed parison becomes chilled by the mold. Consequently when the blank is further expanded in the finishing mold, that portion thereof forming the chilled surface does not flow properly in many cases with the result that laps and other imperfections are formed in the glass constituting the finished product.

An object of the present invention is to shorten the period of contact between the blank and the wall of the parison mold to such an extent that the chilling action will be negligible and, when the blank is expanded to form the finished product, there will be no imperfections in the surface portion of the product due to chilling action.

A further object is to shorten the time of reheating necessary in the blow mold before the expansion of the parison, thereby speeding up production.

Another object is to eliminate not only imperfections such as laps which frequently appear on finished bottles, but also eliminate the baffle marks which invariably occur in the article where the baffle of the parison mold joins the base of the mold.

Another object is to provide a method whereby the parison can be retracted or partially collapsed in the blank mold to such an extent as to permit a better "blow-up" of any letters which should appear on the bottom of the bottle.

With the foregoing and other objects in view which will appear as the description proceeds, the invention consists of certain novel steps in the method and certain details of construction and combinations of parts hereinafter more fully described and pointed out in the claims, it being understood that changes may be made in the method disclosed and in the construction and arrangement of parts without departing from the spirit of the invention as claimed.

In the accompanying drawing the preferred form of the invention has been shown.

In said drawing

Figure 1 is a view partly in section and partly in elevation of a portion of a blank mold equipped with the present improvement and showing a gob therein after it has been forced by a "blow-down" or "settle blow" to form the neck finish.

Figure 2 is a view similar to Fig. 1 and showing the parison after being subjected to a blow-back sufficient to expand it against the walls of the mold and the baffle.

Figure 3 is a view similar to Figs. 1 and 2 illustrating the partial collapse or contraction of the parison immediately following the blow-back whereby the parison is removed from contact with the surfaces of the wall.

In carrying out the method constituting the present invention the gob is deposited in any preferred manner within the blank mold and, as is usual, is forced downwardly about a neck ring so as to completely fill a portion of the mold. This pressure is effected preferably by means of air directed into that end of the mold remote from the neck pin and at the same time a slight suction of air can be set up from the neck portion of the mold, thereby to facilitate the flow of the glass into the neck ring and prevent laps in the glass from being forced from the top down into the neck ring.

After the glass has been moved down into the neck ring by the "settle-blow" and the aid of a slight suction, as stated, the neck pin is withdrawn and a "blow back" of air is effected which expands the blank to the full length of the blank mold and against a baffle plate which is one such as commonly employed. This "blow-back" action is very quick and immediately on the completion thereof a suction is set up through the neck portion of the parison. This suction is merely sufficient to cause the parison to contract slightly so as to become detached from the wall of the blank mold and, if it has not been elevated fully out of contact with the parison before application of the suction, from the baffle. Therefore no excessive chilling and consequent hardening of the surface of the parison occurs and, consequently, the time required for reheating in the blow mold before the parison is expanded, is materially shortened. Furthermore as the glass is hotter than ordinarily and can flow more readily than usual, all signs of the baffle mark where the baffle joins the base of the blank are eliminated when the parison is expanded in the blow mold. Also there is no danger of any laps being formed on the surface of the parison and appearing on the finished article.

For the purpose of carrying out the method described, one form of apparatus has been illustrated in the drawing. In said drawing the blank mold has been indicated at 1, a blow head at 2, a baffle at 3, a neck ring at 4, and a neck pin at 5. This neck pin is to be provided with any suitable mechanism for raising and lowering it in properly timed relation to the blowing operation and there is provided an air chamber 6 to which a pipe 7 leads from a valve casing 8. A pipe 9 for supplying air under pressure is extended to the casing 8 and an exhaust pipe 10 is extended away from said casing. A valve 11 is movably mounted in the casing and when in one extreme position, as shown for example in Fig. 2, the pipes 9 and 7 are in communication so that air under pressure can enter the chamber 6 and expand the parison. When the valve is shifted to a second position, however, as indicated for example in Figure 3, the pipe 7 is in communication with the exhaust pipe 10.

The exhaust pipe 10 opens into a Venturi tube 12 into which projects a nozzle 13 extending from a pipe 14 which can have a controlling valve 15. This valve, when opened, is adapted to direct air under pressure through the nozzle 13 and as this nozzle is pointed toward the Venturi tube 12, the charge of air therefrom and into the tube under pressure will set up a suction through the communicating pipes 7 and 10 from the chamber 6.

The action of this apparatus in carrying out the method described is as follows:

The gob is directed into the blank mold 1 and, while being subjected to a "blow-down" from the head 2, the valve 11 is in the position shown in Fig. 1 so that a slight suction is set up from the lower portion of the blank mold and the chamber 6. This will accelerate the flow of the glass toward and around the neck pin. Immediately following this operation the position of the valve 11 is reversed as shown in Fig. 2 with the result that the glass is expanded against the baffle 3 which had been brought into position and against the walls of the blank mold 1. Obviously, when the valve is in the position shown in Fig. 2, there is no suction through chamber 6 and pipe 7. However this position of the valve is only momentary because it is immediately thrown back to the position shown in Fig. 3 with the result that the parison is partly collapsed because of the slight suction set up through the chamber 6 and pipe 7 and this collapse is sufficient to detach the parison from the walls of the blank mold. Thus the chilling action produced by the blank mold is substantially eliminated and, consequently, when the parison is transferred to the blow mold, the time required for reheating it is greately reduced and the parison will be subjected to its final blow and produce a finished article which is free from laps as well as from the mark generally produced by the baffle where it joins the blank mold. The neck pin can be withdrawn immediately following the first phase of the method illustrated in Fig. 1, and before the parison is subjected to the blow-back.

Preferably, before the valve is thrown to the position shown in Figure 3, for the purpose of partially collapsing the parison, the baffle should be elevated, because it is unnecessary to the operation of partially collapsing the parison that the baffle be seated on the mold, and because, further, it is desirable to keep the parison in contact with any chilling surface no longer than is absolutely necessary.

It has been found in practice that the method of producing a bottle herein described speeds production and produces a finished bottle practically free from imperfections.

What is claimed is:

1. The method of producing a parison which includes the steps of subjecting a partially formed blank to a blow-back to expand the blank against the inner surfaces of the cavity in a parison shaping structure and to the shape of the cavity in said structure, and immediately thereafter subjecting the parison to suction to collapse it and disengage it from surfaces of said structure before removing said structure from the parison.

2. The method of producing a parison which includes the steps of producing a blank having a neck finish, subjecting the blank to a blow-back to expand the blank against all portions of the inner surfaces of the cavity in a blank mold, and immediately thereafter partially collapsing the blank by suction to disengage it from said surfaces of the cavity.

3. The method of producing a parison which includes the steps of subjecting a partially formed blank to a blow-back to elongate and spread the blank to fill the cavity in a parison shaping structure, and immediately thereafter detaching the parison throughout its length from the walls of said cavity by partially withdrawing air from the blank to contract the blank.

4. The method of producing a parison which includes the step of subjecting a gob simultaneously to pressure and suction at opposite ends respectively of a mold cavity to form a partially completed blank, elongating and expanding the blank against the surfaces of the cavity by air under pressure, and immediately thereafter subjecting the interior of the blank to suction to partially collapse the blank throughout its length and detach the blank from the surfaces of the cavity while the mold is closed.

CHARLES B. GARWOOD.

REFERENCES CITED

The following references are of record in the file of this patent:

UNITED STATES PATENTS

| Number | Name | Date |
|---|---|---|
| 744,007 | Proeger | Nov. 10, 1903 |
| 851,163 | Cox | Apr. 23, 1907 |
| 1,635,704 | Canfield | July 12, 1927 |
| 1,680,544 | Ingle | Aug. 14, 1928 |
| 1,680,746 | Peiler | Aug. 14, 1928 |
| 1,945,982 | Rowe | Feb. 6, 1934 |
| 2,063,463 | Rowe | Dec. 8, 1936 |